(12) United States Patent  
Festa

(10) Patent No.: US 11,635,012 B1  
(45) Date of Patent: Apr. 25, 2023

(54) EXHAUST CAPTURE DEVICES AND METHODS

(71) Applicant: Greener Process Systems Inc., Boca Raton, FL (US)

(72) Inventor: Maurizio Festa, Mint Hill, NC (US)

(73) Assignee: Greener Process Systems Inc., Boca Raton, FL (US)

(*) Notice: Subject to any disclaimer, the term of this patent is extended or adjusted under 35 U.S.C. 154(b) by 0 days.

(21) Appl. No.: 17/847,983

(22) Filed: Jun. 23, 2022

(51) Int. Cl.
| | | |
|---|---|---|
| *F01N 13/00* | (2010.01) | |
| *G05D 16/00* | (2006.01) | |
| *B63H 21/34* | (2006.01) | |
| *G05D 16/20* | (2006.01) | |

(52) U.S. Cl.
CPC .......... *F01N 13/004* (2013.01); *B63H 21/34* (2013.01); *F01N 13/008* (2013.01); *G05D 16/028* (2019.01); *G05D 16/204* (2013.01)

(58) Field of Classification Search
CPC .... F01N 13/004; F01N 2590/02; B08B 15/00
See application file for complete search history.

(56) References Cited

U.S. PATENT DOCUMENTS

| | | | | |
|---|---|---|---|---|
| 6,158,213 | A * | 12/2000 | Linberg | F01N 13/08 60/281 |
| 7,258,710 | B2 * | 8/2007 | Caro | B08B 15/02 440/89 R |
| 8,402,746 | B2 * | 3/2013 | Powell | B08B 15/00 60/284 |
| 9,364,874 | B2 | 6/2016 | Morgan | |
| 10,970,927 | B2 * | 4/2021 | Sharp | G06T 13/40 |
| 11,325,687 | B1 | 5/2022 | Sharp | |
| 2016/0023154 | A1 * | 1/2016 | Morgan | B65G 69/18 55/385.2 |
| 2019/0264596 | A1 * | 8/2019 | Sharp | G06T 17/20 |

* cited by examiner

*Primary Examiner* — Anthony Ayala Delgado
(74) *Attorney, Agent, or Firm* — Lerner David LLP

(57) ABSTRACT

A system of controlling the capture of emissions from an exhaust emitter includes a housing including an inlet, a first outlet, and a second outlet; an adapter configured to attach to the exhaust emitter and the inlet of the housing; an attachment assembly coupled to the exhaust emitter, the attachment assembly including at least one leg pivotably coupled to the adapter; at least one valve coupled to the housing; and a control unit capable of communicating with the at least one valve to control the emission of exhaust through the device.

19 Claims, 13 Drawing Sheets

EXHAUST CAPTURE DEVICES AND METHODS

BACKGROUND OF THE DISCLOSURE

The present disclosure generally relates to devices, systems, and methods for automatic hermetic capture of aftertreatment for a variety of exhaust-producing devices, such as diesel engines of ships in harbors, industrial chimneys in cities, and stacks at powerplants. While the preferred embodiment herein describes the capture of exhaust from a ship's exhaust outlet, the devices, systems, and methods described herein can be implemented with any exhaust-producing device to facilitate the automatic capture of aftertreatment. The hermetic aftertreatment capture process allows the exhaust to maintain a constant temperature throughout the post-treatment process via at least one hermetic seal. This seal enables high efficiency of the abatement process and high purity of filtered output. Further, this process provides a conservation of energy for the reutilization of the output for desorbing and for parallel processes like capturing certain gases, such as $CO_2$.

When a ship comes to port, it can moor itself under its own engine power. Alternatively, the mooring of a ship can be carried out by a special tow that connects to the ship entering the port and leads the ship to the mooring area. While this mooring takes place, the ship's primary engines may be shut off and auxiliary engines and boilers may be turned on to supply power to the ship while in port. Thus, under either the ship's primary engines or its auxiliary engines, exhaust will flow from the engines out of a stack or funnel into the atmosphere.

Most modern ships have diesel engines that run on fuels such as HFO (heavy fuel oil), IFO (intermediate fuel oil), LSMGO (low sulfur maritime gas oil), VLSMGO (very low sulfur), and ULSMGO (ultra-low sulfur). Currently, many regulations require ships to switch from HFO or IFO to LSMGO as the ships enter a harbor or port area, and to continue using LSMGO until the ship leaves the harbor. Switching fuels to a lower grade fuel typically results in the ship emitting less sulfur into the atmosphere. Due to the proliferation of cargo shipping in recent years, some harbors remain backlogged and require ships to idle for several days before they can be moored. While switching fuel types limits some of the emissions the ships produce, cities surrounding the harbors are subject to increased pollution from the ships and that increased pollution can directly harm the health and wellness of the cities' residents.

In addition to sulfur pollution, diesel engines often produce other air pollutants including particulate matter (PM), heavy metals (HM), nitrogen oxides ($NO_x$), and other volatile organic compounds. Accordingly, a system of safely and efficiently capturing multiple types of harmful emissions from ships while ships idle in and around ports is desired. Such a system is described herein.

BRIEF SUMMARY OF THE INVENTION

According to one aspect, a system of controlling the capture of emissions from an exhaust emitter comprises a housing including an inlet, a first outlet, and a second outlet; an adapter configured to attach to the exhaust emitter and the inlet of the housing; an attachment assembly coupled to the exhaust emitter, the attachment assembly including at least one leg pivotably coupled to the adapter; at least one valve coupled to the housing; and a control unit capable of communicating with the at least one valve to control the emission of exhaust through the device.

According to another aspect, the at least one valve includes a first valve located between the housing and the first outlet, and a second valve located between the housing and the second outlet.

According to a different aspect, the exhaust emitter is at least one of an exhaust-producing funnel of a ship, a smokestack of a power plant, or a chimney of an industrial system.

According to another aspect, the at least one leg includes six legs positioned radially around a shaft.

According to yet another aspect, the attachment assembly further comprises a motor and a gear assembly, the gear assembly operably coupling the shaft to the motor.

According to another aspect, the shaft includes teeth configured to mate with a gear of the gear assembly.

According to a different aspect, a system for capturing exhaust from a stack comprises a housing including at least one inlet and at least one outlet; an actuator operably coupled to a gear assembly; a shaft within the housing operably coupled to the gear assembly, the shaft attached to at least one leg configured to engage the stack; at least one valve attached to the housing at the least one outlet; and at least one sensor in communication with a control unit, the control unit configured to adjust the at least one valve based on a reading from the at least one sensor.

According to another aspect, the system further comprises an adaptor configured to couple with and create a hermetic seal with the housing and with the stack.

According to another aspect, the adaptor is selectable according to the stack.

According to a different aspect, the actuator is at least one of a motor or a hydraulic piston.

According to another aspect, the shaft includes teeth corresponding to teeth of a gear assembly such that rotation of the gear assembly causes the shaft to translate relative to the gear assembly.

According to yet another aspect, the at least one valve includes a first valve attached to the housing and exposed to the atmosphere and a second valve attached to the housing and exposed to an exhaust outlet.

According to a further aspect, the control unit is configured to modulate the first valve and the second valve to maintain an atmospheric pressure within the housing.

According to a different aspect, the at least one leg has three outer walls defining a cavity therebetween.

According to another aspect, a method of capturing emissions from an exhaust emitter comprises activating an actuator to translate a shaft relative to an adaptor; pivoting at least one leg operably coupled to the shaft to engage the exhaust emitter; sealing an emission capture device to the exhaust emitter by attaching a gasket of the adaptor to the exhaust emitter; sensing emission data from an inlet of a housing; and modulating a first valve operably coupled to a first outlet of the housing and a second valve operably coupled to a second outlet of the housing based on the emission data.

According to a further aspect, the step of sensing emission data includes sensing the emission data from a differential pressure sensor located in the housing.

According to another aspect, the step of modulating the first valve and second valve includes opening the first valve when the differential pressure sensor detects a non-zero value between an exhaust pressure and an atmospheric pressure.

According to a different aspect, the step of modulating the first valve and second valve includes opening the second valve and closing the first valve when the differential pressure sensor detects a zero valve between an exhaust pressure and an atmospheric pressure.

According to another aspect, the method further comprises positioning the emission capture device over the funnel with a robotic arm.

According to a different aspect, the step of modulating the first valve and second valve includes maintaining a constant temperature within the housing.

DETAILED DESCRIPTION

The measurements, values, shapes and geometric references (such as perpendicularity and parallelism) in this document, when coupled with words such as "approximately" or similar terms, such as "nearly" or "substantially", are to be understood as acknowledging measurement errors or inaccuracies due to production and/or manufacturing errors and, above all, minor variations from the associated value, measurement, shape or geometric reference. When these terms are associated with a value, for instance, they preferably indicate a variation of no more than 10% of the value. When terms such as "first", "second", "superior", "inferior", "main" and "secondary" are used, furthermore, they do not necessarily indicate an order, a relationship of priority or a relative position, but may be used simply to clarify the distinction between different components. Further, the term "inflow" generally refers to a direction toward the ship's stacks and the term "outflow" generally refers to a direction away from the ship's stacks.

Figure 1:
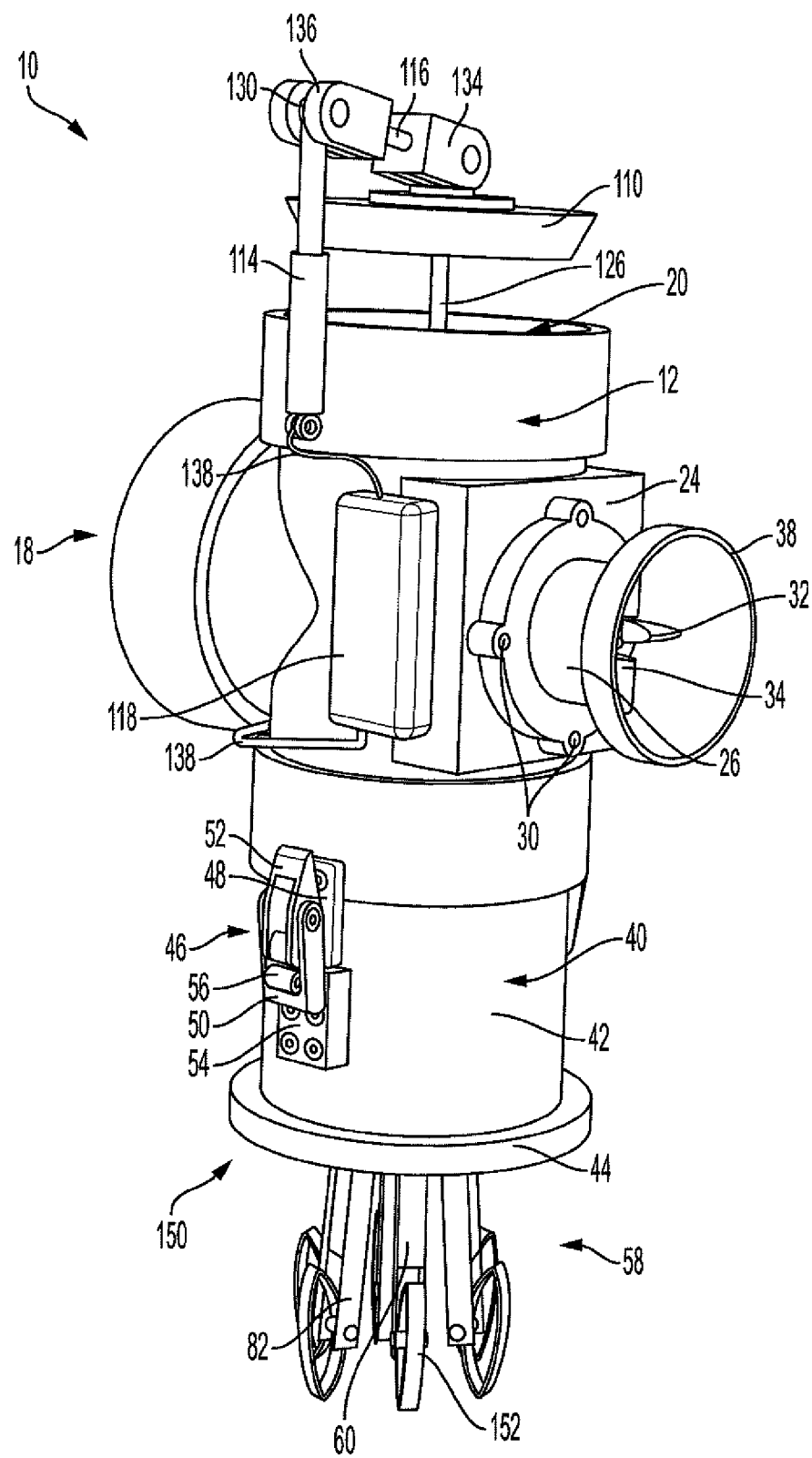
FIG. 1 is a perspective view of an emission capture device, according to one embodiment of the disclosure.

FIG. 1 illustrates an emission capture device 10 according to one embodiment of the disclosure. Although the emission capture device 10 depicted and described herein is used in the shipping industry for fuel-dependent ships around or near harbors, it is envisioned that the emission capture device 10 could also be utilized with other emission producing devices on both land and water including but not limited to power plants, automobiles, long haul freight, trains, airplanes, and the like.

Emission capture device 10 includes a housing 12. As depicted, housing 12 is configured in a T-shape including an inlet 16 and two outlets 18, 20; however, other housing configurations, such as a spherical housing with a plurality of inlets and a plurality of outlets are envisioned. Inlet 16 is configured to attach to a stack of a vessel, hereinafter referred to as a funnel 14. First outlet 18 extends approximately 90° from inlet 16 and guides exhaust from funnel 14 toward the treatment station 22. Second outlet 20 extends approximately 180° from inlet 16 and approximately 90° from first outlet 18. Second outlet 20 is a release outlet configured to release exhaust directly to the atmosphere. A series of valves described herein control the flow of exhaust from inlet 16 to first and second outlets 18, 20. Housing 12 is preferably a monolithic piece to avoid the possibility of exhaust escaping through a gap where the individual pieces are coupled. Further, although housing 12 is depicted herein in a T-shape with an inlet and outlets positioned approximately 90° from each other, it is envisioned that housings of other orientations, such as a housing with side outlet elbows extending 90° from each other in the same plane and an inlet positioned 90° from the elbows but in a separate plane, can be implemented with emission capture device 10.

Housing 12 includes a mounting portion 24 in which a robotic arm 28 can attach to housing 12 and manipulate it to align with funnel 14. Mounting portion includes a flat surface in which an interlocking port 26 can securely attach to. Mounting portion 24 is preferably monolithically formed with housing 12 to limit the possibility of gaps in the system where exhaust could escape to the atmosphere. Interlocking port 26 is attachable to both mounting portion 24 and a distal end of robotic arm 28. Interlocking port 26 may be attached to mounting portion 24 by inserting fasteners (not shown) through attachment holes 30 into the flat surface of mounting portion 24. Alternatively, interlocking port 26 may be monolithically formed with housing 12. Interlocking port 26 includes an arm receiver 32 in which a distal end of robotic arm 28 attaches to. The arm receiver 32 depicted in FIG. 1 is substantially concave, although different shaped receivers are envisioned. Within arm receiver 32 is a pin attachment device 34 configured to receive and engage with an interlocking pin 36 extending from a tip mount 38 of robotic arm 28. Interlocking pin 36 acts as the robotic arm's sixth axis of movement and allows the emission capture device 10 to be rotated around the end of robotic arm 28. Pin attachment device 34 may be dimensioned to complement various interlocking pins depending on the type of the robotic arm 28 implemented.

Robotic arm 28 may be any robotic arm known in the art that is configured to move along six axes. A six-axis robot allows the arm 50 to move in each of the x, y, and z planes and also to perform roll, pitch, and yaw movements. Thus, a six-axis robot closely mimics a human arm and would allow for ideal placement of emission capture device 10 on top of funnel 14. Notably, interlocking pin 36 of robotic arm 28, which provides the sixth axis of movement, is configured to extend into pin attachment device 34 to rotatably lock in place and allow for rotation in a direction similar to the direction of a human's wrist rotation. Further, the tip mount 38 attaches direction to interlocking port 26, which allows for the robotic arm's fifth axis of movement of pitch and yaw.

Figure 2:
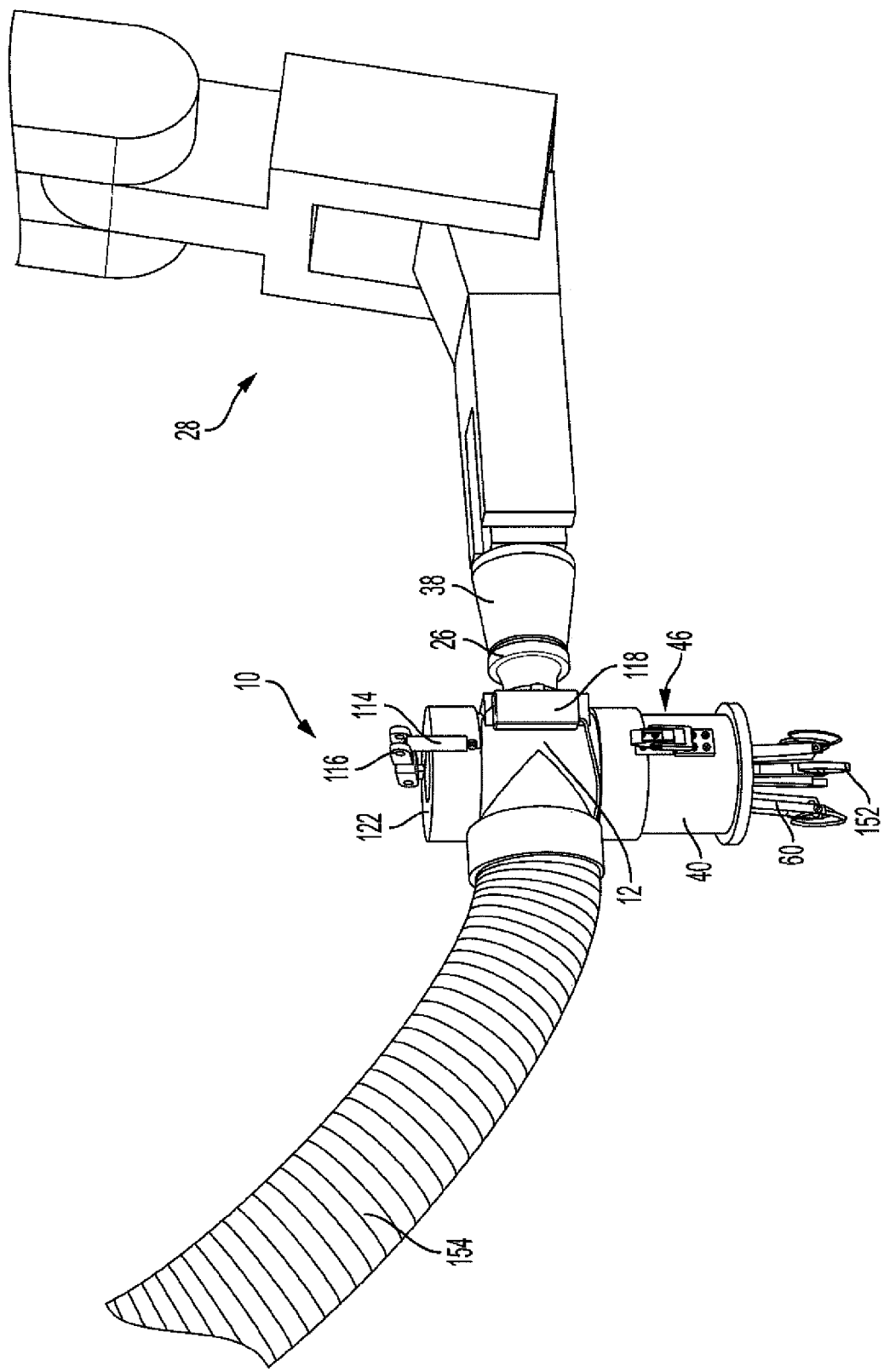
FIG. 2 is a perspective view of the emission capture device of FIG. 1 attached to a robotic arm and an outlet duct.
Figure 3:
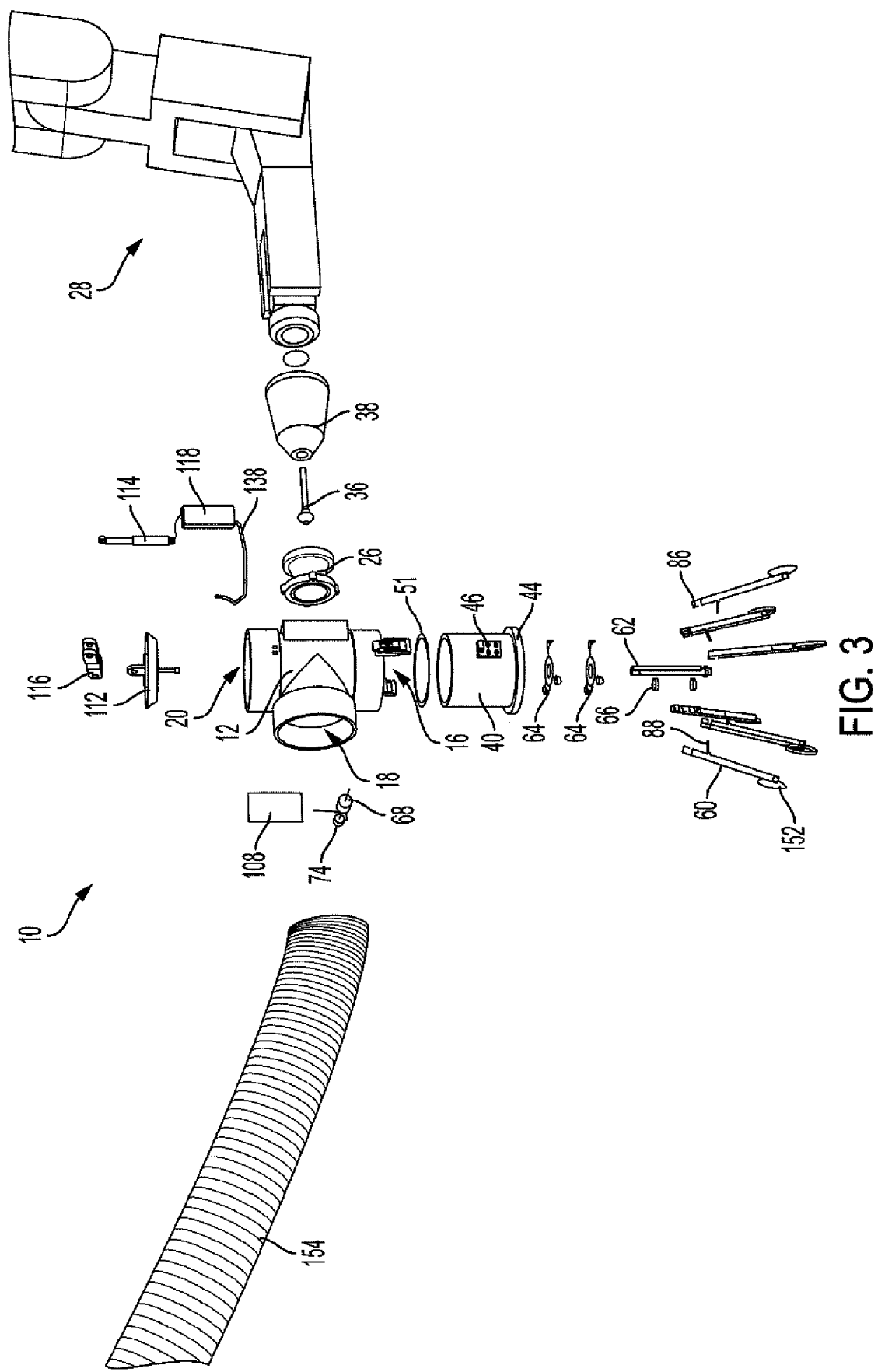
FIG. 3 is an exploded perspective view of the emission capture device, robotic arm, and outlet duct of FIG. 2.

An interchangeable adaptor 40 depicted in FIGS. 1-3 is attachable to first inlet 16 of housing 12. A primary purpose of adaptor 40 is that it may be the only interchangeable part of emission capture device 10 for fitting on different size funnels 14. Thus, a single housing 12 and its internal components and control systems can be implemented for any funnel 14, and only adaptor 40 needs to be swapped for certain funnels. As depicted, adaptor 40 is substantially cylindrical with a rigid body 42 and a rim 44. Body 42 has an outer diameter than is smaller than an inner diameter of inlet 16 of housing 12. This allows adaptor 40 to be inserted into inlet 16. Further, the outer diameter of body 42 is dimensioned in a manner that produces an airtight fit, or close to an airtight fit, when inserted into inlet 16 to prevent exhaust from escaping. An O-ring or other type of sealant may be placed around body 42 to ensure an airtight fit between adaptor 40 and inlet 16. Rim 44 extends around the circumference of a bottom portion of body 42 and extends radially outward to a dimension greater than the diameter of funnel 14. Thus, rim 44 can have an inner diameter that is different than the inner diameter of body 42, which in turns allows an operator to select different adapters for different size funnels. Alternatively, rim 44 can extend outward from body 42 in a non-circular manner to match the shape of a funnel that is elliptical, square, or another shape. Similar to housing 12, adaptor 40 is preferably monolithically constructed to prevent the possibility of gaps and subsequent air leaks.

Figure 4:
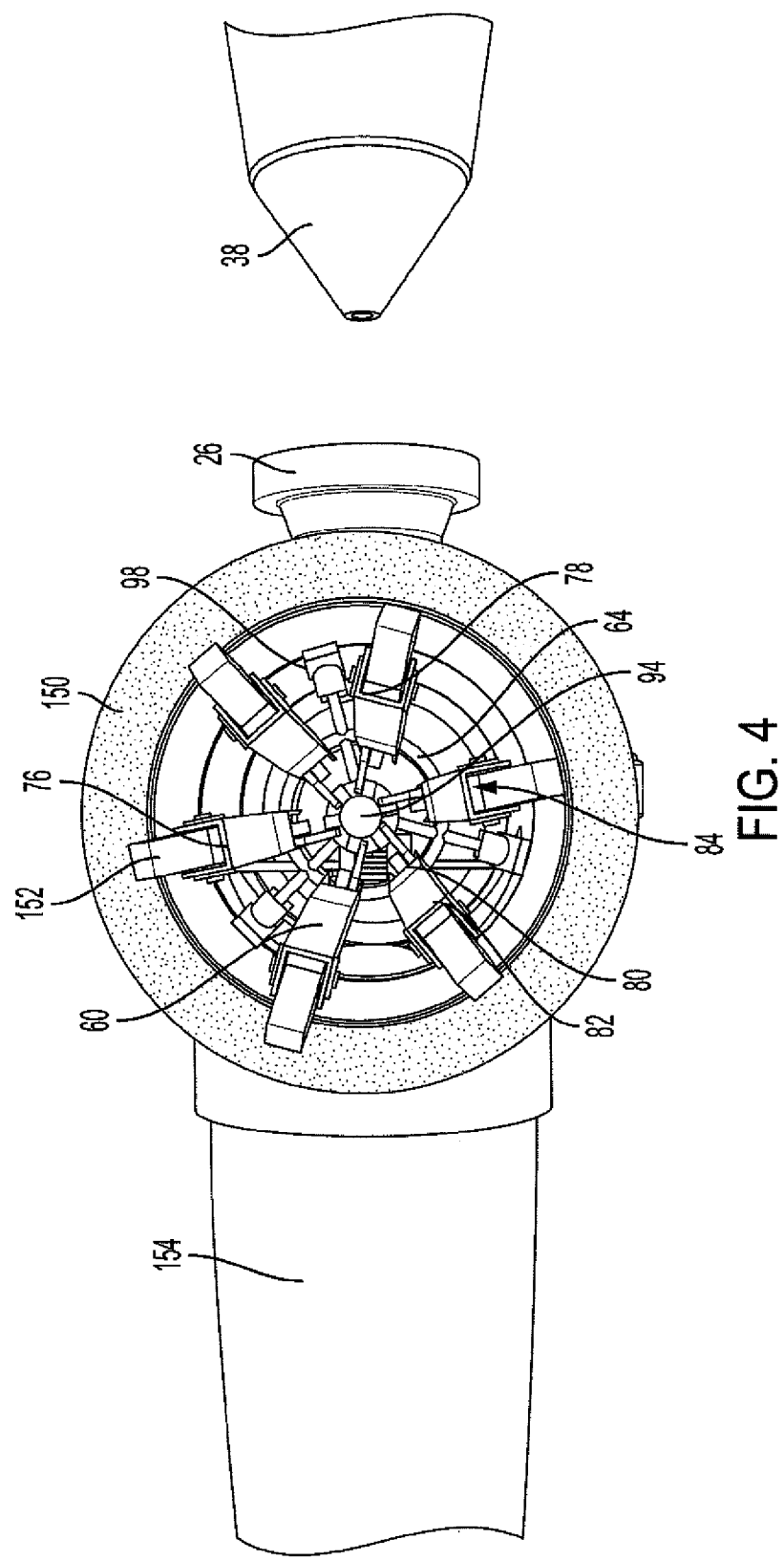
FIG. 4 is a bottom view of the emission capture device of FIG. 1.

As illustrated in FIG. 4, rim 44 includes a gasket 150 on its underside configured to create a hermetic seal between funnel 14 and adaptor 40. In such a manner, the gasket can be circular, elliptical, square, or another shape to match the shape of funnel 14. Gasket 150 may be formed from any material known in the art that is capable of withstanding the high temperature of the exhaust leaving a vessel's diesel engine. These materials can include graphite, ceramic composites, other high-temperature fibers, certain metals, or combinations thereof. Gasket 150 is optimized to create a hermetic seal that maintains a constant exhaust temperature between funnel 14 and housing 12. This constant temperature improves the efficiency of the abatement process and can also include the benefit of generating power that is harnessed for additional and secondary processes such as $CO_2$ capturing, desorbing, and storage.

A latch mechanism 46 is implemented to secure adaptor 40 to inlet 16 of housing 12. Latch mechanism 46 may extend from a bottom rim 44 of housing 12 adjacent inlet 16. Latch mechanism 46 may include a base plate 48, arm 50, and hinge portion 52. Base plate 48 may attach to rim 44 using fasteners or other attachment types and extend downwards past rim 44. A receiving plate 54 is attached to body 42 of adaptor 40 and has a hook 56 for securely engaging arm 50. Receiving plate 54 may attach to body 42 of adaptor 40 with fasteners or other attachment types known in the art. In use, an operator or robot can grasp hinge portion 52 to loosen it and allow arm 50 to extend towards adaptor 40. Once arm 50 is securely engaged with hook 56, hinge portion 52 can be clamped downward to lock latch mechanism 46 in place. The same process can be repeated in reverse steps to unlatch latch mechanism 46. Alternatively, other latching mechanism known in the art may be utilized to secure adaptor 40 to housing 12 such as buckles, pressure fits, fasteners, or the like.

Figure 6:
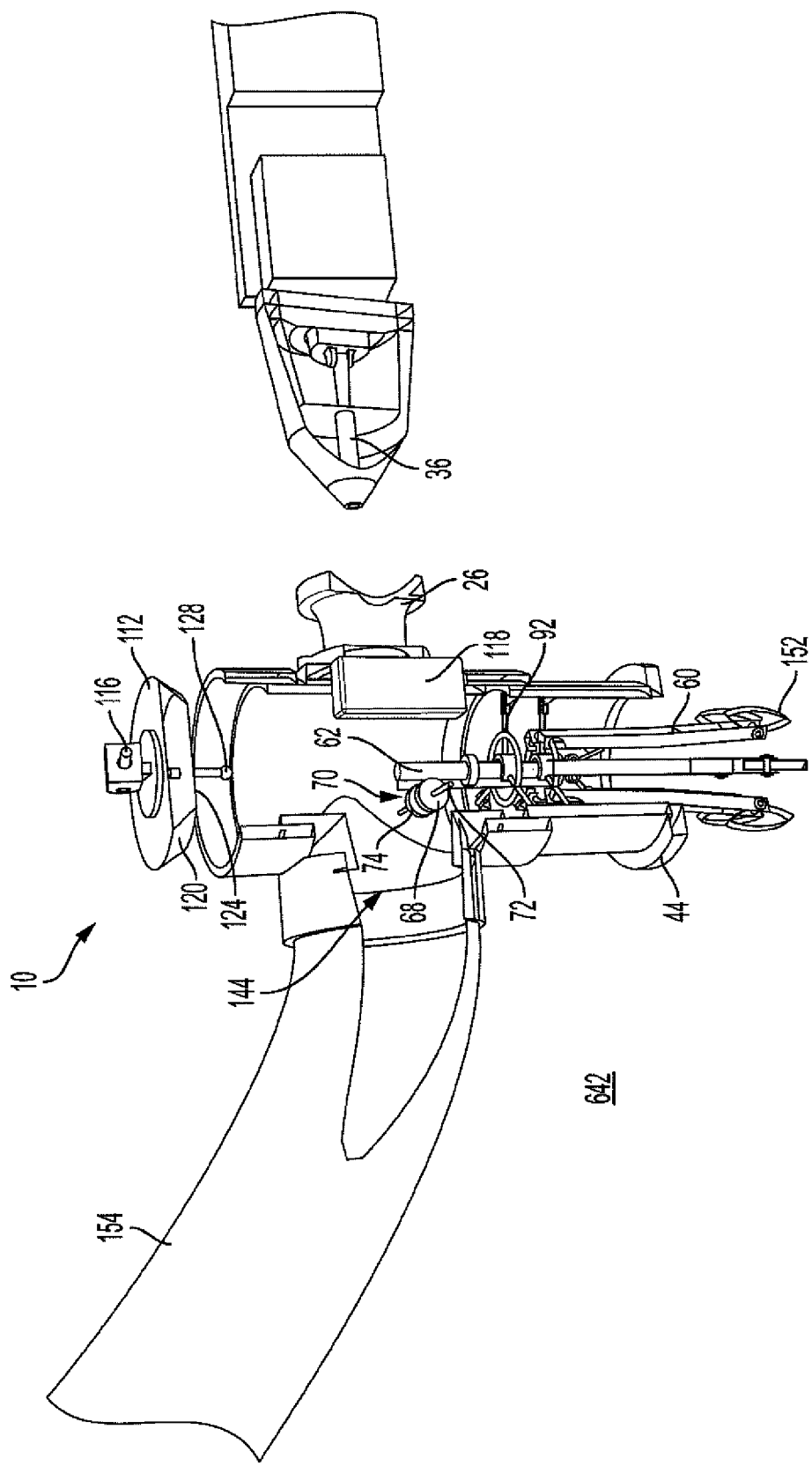
FIG. 6 is a side cut-away view of the emission capture device, robotic arm, and outlet duct of FIG. 2.
Figure 7:
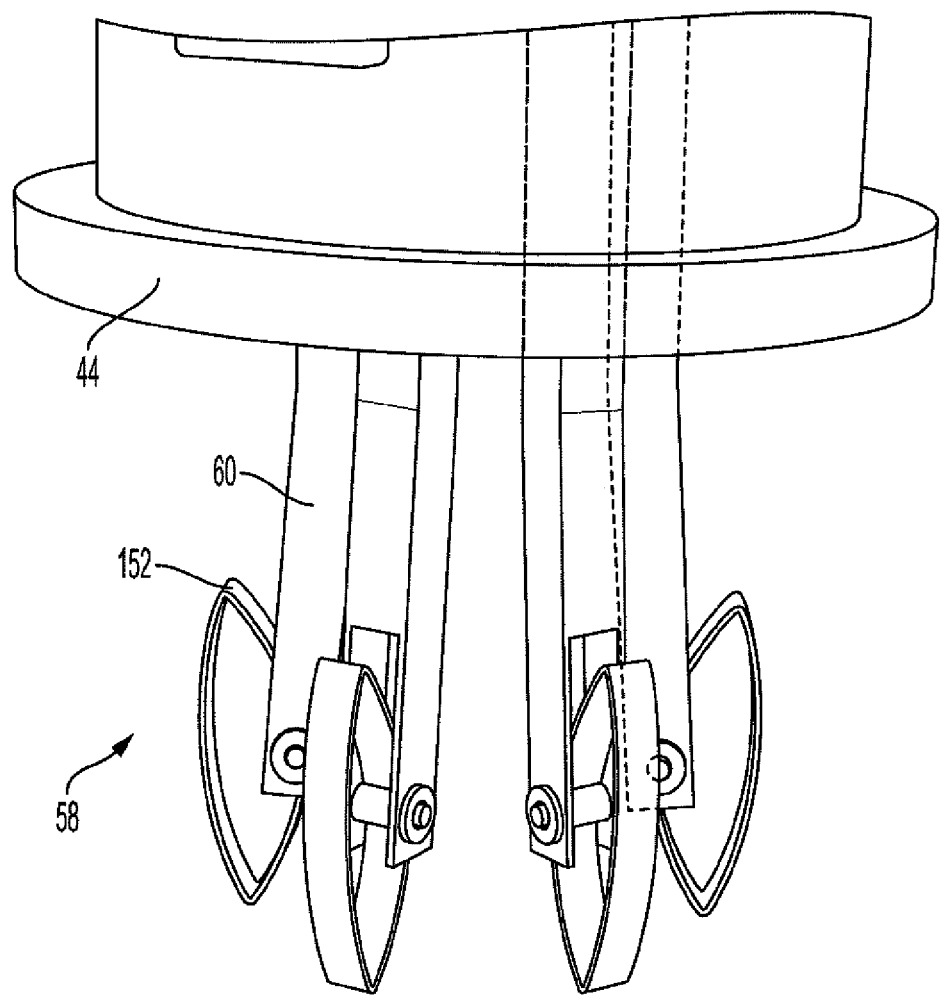
FIG. 7 is an enhanced view of a lower portion of emission capture device of FIG. 1.
Figure 8:
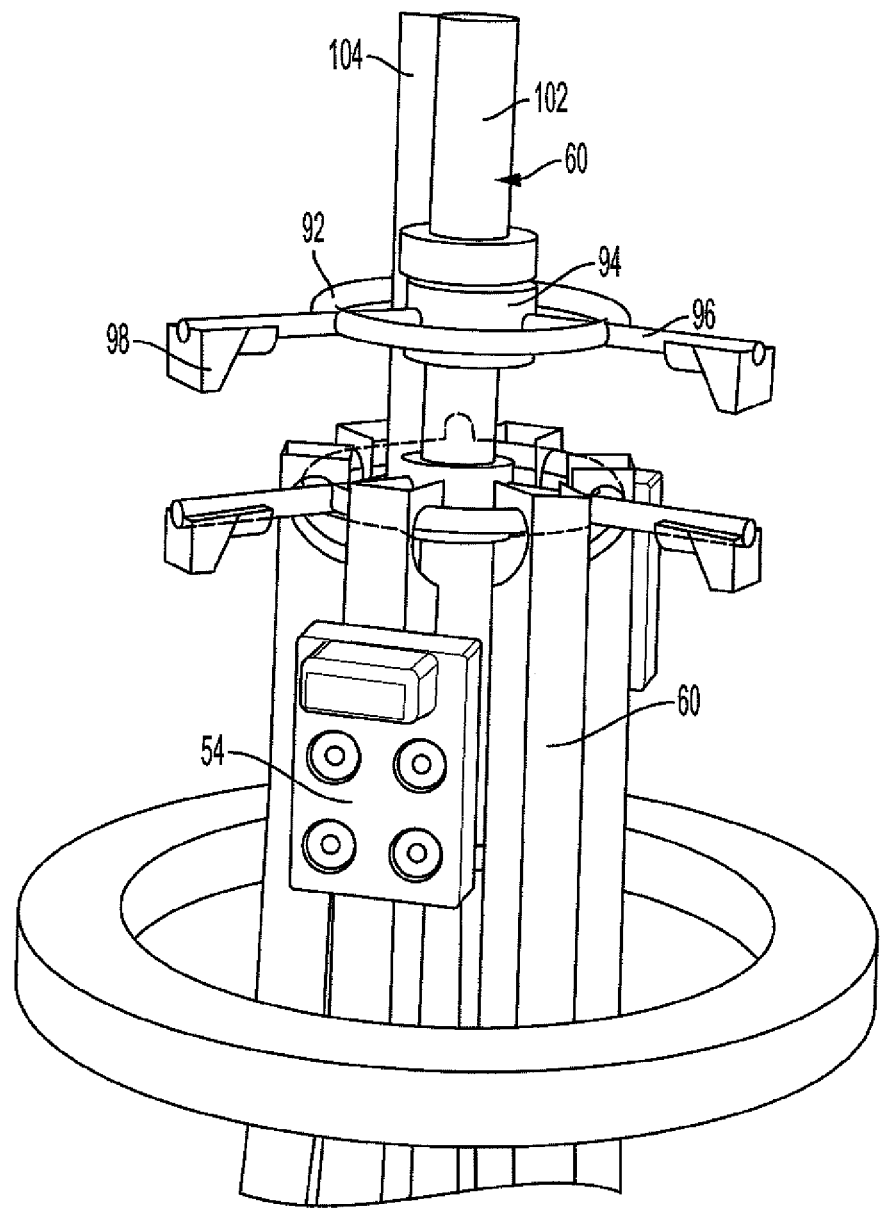
FIG. 8 is an enhanced view of internal components of the emission capture device of FIG. 1.
Figure 9:
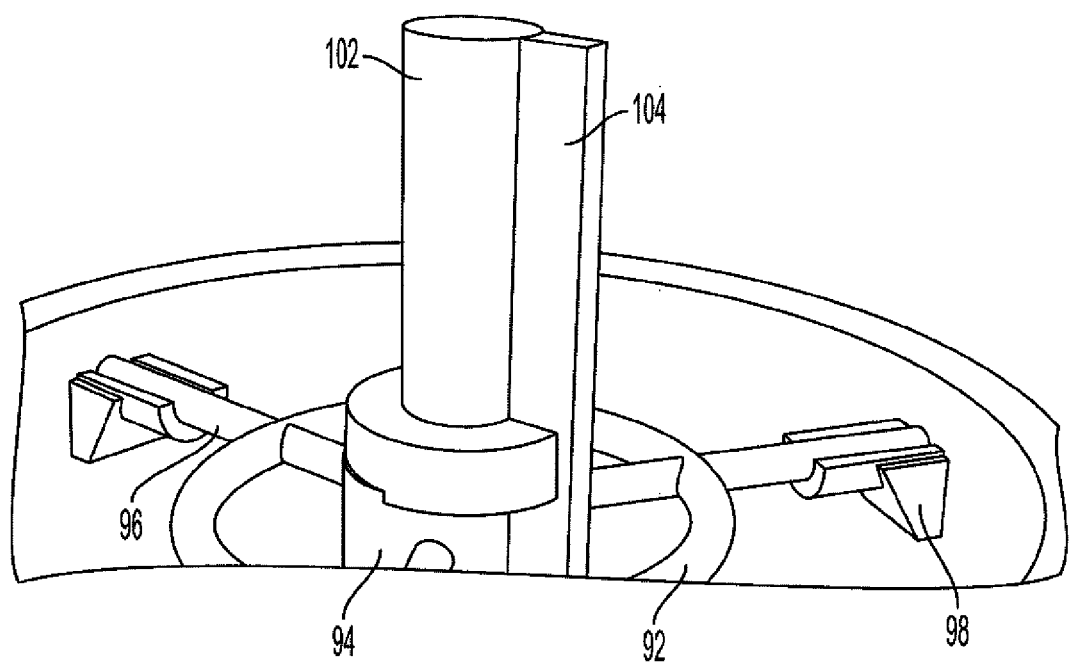
FIG. 9 is another enhanced view of internal components of the emission capture device of FIG. 1.

FIGS. 6-8 depict a leg assembly 58 used to secure emission capture device 10 to funnel 14. Leg assembly 58 includes a plurality of legs 60 surrounding and rotatably attached to a shaft 62. However, in alternative embodiments, a single leg or a plurality of legs may be implemented with leg assembly 58. Shaft 62 is slidably attached to adaptor 40 and housing 12 via a series of supports 64. Shaft limits 66 act as stoppers to prevent shaft 62 from sliding through support 64. At an upper end, teeth formed in a portion of shaft 62 engage with corresponding teeth of gear 68 located on gear assembly 70. gear assembly 70 includes an output shaft 62, at least one gear 68, and a motor 74 configured to turn output shaft 62. Each of these components will be described in greater detail herein.

Each leg 60 of leg assembly 58 extends along a longitudinal axis and has three outer walls 76 that substantially form a U-shape defining a cavity 84 in the center. Thus, each of the three walls 76 of legs 60 defines a thickness 78 and the thickness 78 of each of the three outer walls 76 may be substantially uniform. This design is advantageous as it allows for exhaust to flow through legs 60 when legs are secured around funnel 14, rather than blocking flow of exhaust through inlet 16. If the flow of exhaust were blocked, it could cause the system pressure to increase, which could result in a more inefficient capture of emissions, or even backpressure sent through funnel 14. This can be illustrated with Bernoulli's principle, which holds that an increase in a fluid's speed is accompanied by a decrease in the fluid's pressure. Applied to this system, if legs 60 were rectangular prisms and did not permit airflow to pass therethrough, the resulting system pressure would increase and make it more difficult to properly divert the exhaust through valves to treatment station 22.

Legs 60 extend from an upper portion 80 to a lower portion 82. The upper portion 80 defines an attachment feature 86 for attaching the leg to support 64. Attachment feature 86 may be a hook as shown in FIG. 6, or another attachment feature such as a slot, hinge, or the like. A connecting rod 88 extends from and is rotatably attached to cavity 84 and is configured to attach to a pivot point 90 located on either shaft 62, support 64, or shaft limit 66. In such a configuration, connecting rod 88 is pivotable with respect to both legs 60 and shaft 62 and causes lower portion 82 of legs 60 to extend radially outward away from shaft 62 to attach to the inside of funnel 14. Connecting rod 88 may be a rigid rod as depicted, or it could also be a spring configured to bias legs 60 radially outward away from shaft 62. The spring embodiment may be advantageous as the biasing force would secure adaptor 40 to funnel 14. Even if connector rod 88 is rigid, a spring or other form of biasing element may be placed at another location along the length of leg 60 to bias leg 60 radially outward away from shaft 62.

Lower portion 82 of legs 60 includes a spring 152 configured to aid in attaching adaptor 40 to the inside of funnel 14. Spring 152 may be any spring known in the art, such as a harmonic steel spring or the like. When leg 60 is biased outward from shaft 62 via connecting rod 88 or via another biasing element, spring 152 contacts the inner surface of funnel 14 and causes a force that pushes the lower portion 82 of leg 60 away from the inner surface of funnel 14. Thus, in such a configuration, the legs 60 cause a pushing force into the inner funnel wall and the springs cause an opposed force directed back toward shaft 62. This force is configured to maintain an equilibrium which secures adaptor 40 to funnel 14 until a release is pressed to move legs 60 radially inward. This force equilibrium, in conjunction with gasket 150 forming a hermetic seal between adaptor 40 and funnel 14, allows for a hermetic seal to be formed. Although the embodiment depicted in FIGS. 1-8 shows six legs 60, a different number of legs, such as a single leg or two legs, may be implemented. Further, other attachment mechanisms than legs may be implemented. For example, a gripper with a set of jaws (not shown) may be implemented to attach to an outer rim of funnel 14.

FIG. 8 depicts a support 64 according to one embodiment. Support 64 is substantially circular to fit snugly within adaptor 40. Support 64 has an outer rim 92 extending around a hub 94. At least one arm 50 extends radially outward from hub 94 to a point past outer rim 44. Outer rim 92 may include a hole through which arm 50 extends. A brace 98 is located at the end of arm 50 opposite hub 94 and is configured to brace against the side of either adaptor 40 or housing 12. Brace 98 may attach to arm 50 via a pressure fit of arm 50 within a cradle portion (not shown) of brace 98, or with fasteners or other attachment types known in the art. Arm 50 may attach to hub 94 using similar attachment methods. Hub 94 is cannulated to allow shaft 62 to pass therethrough. In such a configuration, the inner diameter of hub 94 is preferably larger than an outer diameter of shaft 62. Although the embodiment depicted shows two supports 64, it is envisioned that any number of supports 64 may be utilized to secure leg assembly 58 to housing 12. Various ledges (not shown) may be placed around the inner diameter of adaptor 40 and inlet 16 of housing 12 to allow support 64 to rest on the ledge without being pulled lower from the weight of the legs 60.

Shaft limits 66 are also generally circular and cannulated to accept shaft 62. Shaft limits 66 may have a key 100 to accept a toothed portion 104 of shaft 62. In such a manner, shaft 62 may only be slid through shaft limit 66 in one orientation such that a toothed portion 104 of shaft aligns with key 100. A similar key 100 may be integrated with support 64. Unlike support 64, shaft limit 66 is securely fastened to shaft 62 to act as a stopper. Thus, as shaft 62 translates up and down, shaft limit 66 translates with shaft 62 and prevents movement of shaft 62 when it contacts an adjacent support 64. Supports 64 can therefore be set at various heights within adaptor 40 to set a preferred range of motion for legs 60.

FIG. 8 illustrates a shaft 62 according to one embodiment. Shaft 62 extends along a longitudinal axis and includes a column 102 and a toothed portion 104. Column 102 is substantially cylindrical and preferably has a smooth outer surface to facilitate translation of shaft 62 through support 64. The diameter of shaft 62 is dimensioned to fit within the cannulated portion of support 64 and shaft limit 66. A toothed portion 104 extends radially outward from column 102 at one point around the circumference of column 102. In such a manner, shaft 62 does not have a true circular cross-section, but rather has a semi-circular cross-section with a keyed portion extending away from the non-circular portion. Thus, shaft 62 may only extend through support 64 and shaft limit 66 in one rotational orientation.

Toothed portion 104 is configured to mate with teeth of a gear 68 of gear assembly 70. When engaged, rotation of gear 68 causes shaft 62 to translate either up or down along its longitudinal axis, i.e., along the same direction of toothed portion 104. This gearing mechanism acts as a ratchet mechanism that allows for translation of shaft 62 in a single direction. In this embodiment, a pawl (not shown) may be rotatably attached to gear assembly 70 and spring-loaded in a manner that biases the pawl to extend toward gear 68 so that it can extend into the recesses between the gear teeth. As gear 68 rotates and causes toothed portion 104 to translate, the pawl may contact either toothed portion 104 or gear 68 to prevent either translation or rotation in the opposite direction. For example, rotation of gear 68 in a first clockwise direction may cause shaft 62 to translate downward, which in turns opens legs 60. To translate shaft 62 upward to close legs 60, a pawl release (not shown) may be actuated to disengage pawl from either gear 68 or toothed portion 104 to allow rotation of gear 68 in the opposite direction to raise shaft 62. Although the example previously described involves clockwise rotation of gear 68 to open legs 60, it is envisioned that counterclockwise rotation could also be utilized to open legs 60. In other embodiments, different mechanisms than a pawl may be implemented to prevent translation of shaft 62 in a certain direction.

Toothed portion 104 may include a series of teeth spaced linearly along the longitudinal axis of shaft 62. Further, toothed portion 104 may be dimensioned to correspond with the teeth of gear 68, such that rotation of gear 68 causes translation of shaft 62. In doing so, the teeth of gear 68 (not shown) may extend into corresponding roots of toothed portion 104 and vice versa, thus allowing shaft 62 and gear assembly 70 to be rotatably coupled together. Toothed portion 104 may be considered a belt, rack, or other linear gear system configured to engage with a circular gear such as a pinion or worm gear.

FIG. 6 illustrates a preferred embodiment of a gear assembly 70 that includes a gear 68, rotation shaft 62, and motor 74. Motor 74 may attach to an outer surface of housing 12 or may be internally mounted in a protective cage to ensure exhaust gases do not cause damage. Motor 74 may be any standard motor known in the art, such as an AC brushless or DC brushed motor. A battery (not shown) may be attached to an external surface of housing 12 to power motor 74. In another embodiment, motor 74 may be powered through renewable energy sources. Because the emission capture device 10 is utilized outdoors in port cities that may have few obstructions, renewable sources like solar or wind may be utilized instead of or in conjunction with a battery to power motor 74 or other electronic devices within emission capture device 10. Solar panels (not shown) may be affixed to an outer surface of housing 12 or to another vessel in which emission capture device 10 is attached. Alternatively, wind-harnessing devices such as wind turbines may be placed on top of housing 12 or on vessel to harness the wind flowing around and through harbors. In either of these embodiments, a hard-wired connection may exist between the energy source and the motor. A visual indicator may be located on a surface of housing 12 to show an operator the remaining battery life available. The visual indicator may be a series of light emitting diodes (LED) configured to change color or turn off entirely as the battery charge is diminished. Alternatively, in other embodiments, another type of actuator such as a hydraulic piston may be implemented in place of gear assembly 70 to engage a leg assembly with a funnel.

Motor 74 outputs a rotational force on output shaft 62. Output shaft 62 extends from motor 74 inside housing 12 to at least a first gear 68. Gear 68 may be rotatably coupled to output shaft 62 via a collar or other coupling device known in the art. Gear 68 may be a rack gear configured to translate on a pinion of toothed portion 104 of shaft 62. In other embodiments with a 90° angle between rotation shaft 62 and shaft 62, other gears such as bevels, worms, or the like may be utilized. In embodiments where a 90° angle is not feasible, gear 68 may be a crossed helical gear, certain bevels, and the like. As described herein, gear 68 has teeth configured to mate with corresponding teeth of toothed portion 104 of shaft 62. The teeth (not shown) may be straight or curved depending on the type of gear utilized. Further, multiple gears may be placed along rotation shaft 62 in embodiments where multiple gears are required to translate shaft 62 or due to a unique geometry of housing 12. Various sensors may be coupled to gear assembly 70 to track characteristics such as rotations per minute (rpm) of rotation shaft and direction of rotation. Such sensors may be part of a leg control unit 108 that may also house motor 74 and/or a battery. Leg control unit 108 may be coupled to the outside of housing 12 using fasteners, adhesives, or the like.

Housing 12 includes second outlet 20 located opposite inlet 16 and configured to allow an escape for exhaust to flow out of emission capture device 10 directly into the atmosphere. Exhaust may be diverted through housing 12 through a series of valves, one of which being a modulating top valve 110. Modulating top valve 110 is configured to raise and lower a valve top 112 to sealably cover second outlet 20. Valve top 112 may be coupled to emission capture device 10 by an actuator 114 and a connecting rod 116 and be operated by a control unit 118, each component described in further detail below.

Figure 5:
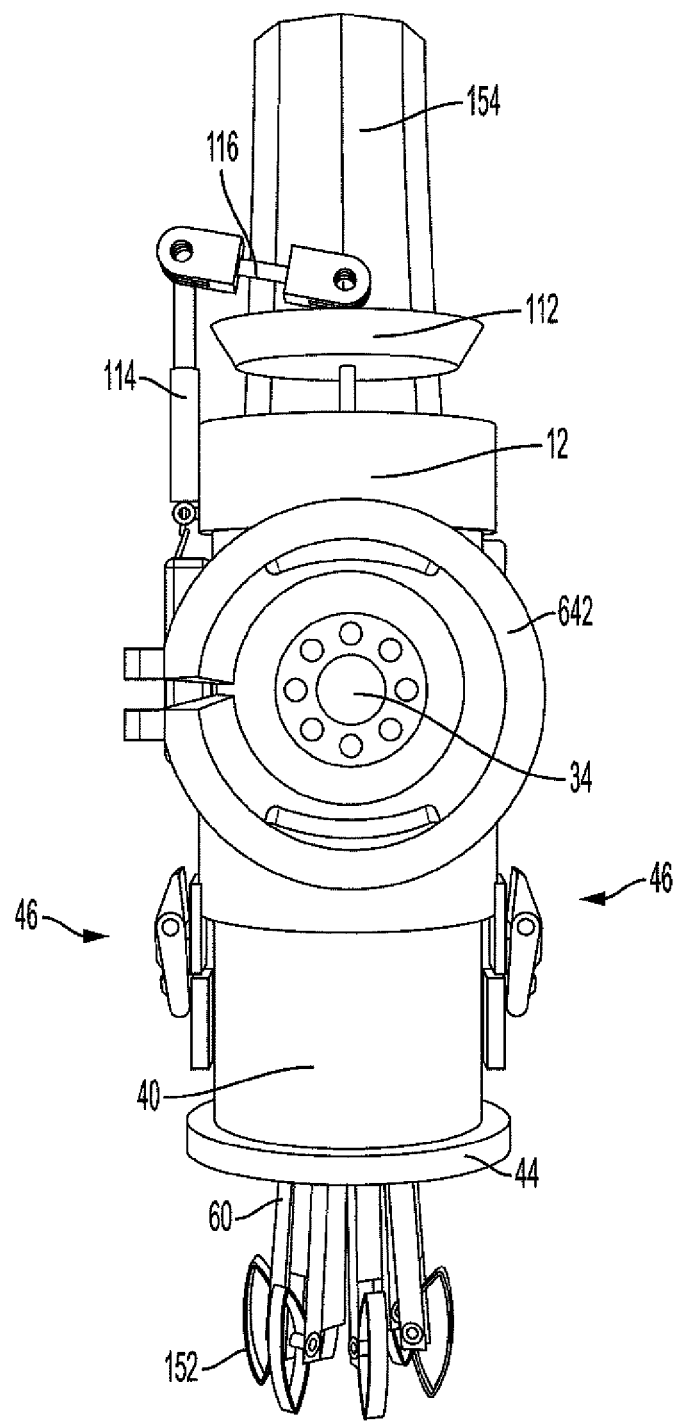
FIG. 5 is a front view of the emission capture device of FIG. 1.

FIGS. 5-6 illustrates valve top 112 according to one embodiment. Valve top 112 is generally frustoconical with a continuous conical surface 120 defined between two flat surfaces, each of the two flat surfaces corresponding to a top and bottom surface 122, 124 of valve top 112. The diameter of second outlet 20 is preferably larger than the diameter of bottom surface 124, but smaller than the diameter of top surface 122. In such a configuration, the conical surface 120 of valve top 112 may act as a hermetic seal with second outlet 20 to prevent exhaust from escaping into the atmosphere while valve top 112 is closed.

Valve top 112 translates up and down along a post 126. Post 126 may be cylindrical and have a stopper 128 at its lower end to abut the bottom surface 124 of valve top 112 to raise it. The weight of valve top 112 may lower it over second outlet 20 without the need for actuation of post 126. Alternatively, valve top 112 may only be lowered by actuation of post 126. Post 126 extends through a hole formed entirely through valve top 112 and centrally positioned through top surface 122 and bottom surface 124. Thus, when post 126 is raised so that stopper 128 contacts bottom surface 124, a uniform force lifts valve top 112 entirely off second outlet 20 without tilting or causing an uneven lifting force.

The top of post 126 has a hook portion 130 configured to engage with a first end 134 of a connecting rod 116. A pin (not shown) may be inserted through a hole in the hook portion 130 that aligns with a hole in first end 134 of connecting rod 116. Other hinge types known in the art may also be utilized in place of a pin being inserted through a hole. Connecting rod 116 extends from first end 134 to second end 136. Connecting rod 116 may be a cylindrical rod extending between first end 134 and second end 136, each of first and second ends 134, 136 being U-shaped to fit around hook portion 130 and a connecting portion of an actuator 114. However, other foreseeable connecting rod designs may be implemented without departing from the spirit of the present disclosure.

Actuator 114 is configured to transmit a vertical force to connecting rod 116, which in turn raises valve top 112. Actuator 114 may be a hydraulic actuator, such as a piston, with an outer sleeve surrounding an inner sleeve. A hydraulic system (not shown) with a fluid reservoir and at least one pump may allow for the vertical translation of the inner sleeve relative to the outer sleeve. Alternatively, other types of actuators may be implemented, such as pneumatics, electric actuators, or the like. An upper portion of actuator 114 may include a connecting portion 132 configured to engage with second end 136 of connecting rod 116. This connection may be facilitated by a pin inserted through a hole or another connection type known in the art. Actuator 114 may extend through a guide (not shown) positioned on housing 12 to align it with a control unit 118.

Actuator 114 may include a wired connection 138 to control unit 118. Control unit 118 may be a standard control unit known in the art and preferably has at least the capabilities of receiving user inputs, receiving inputs from the various sensors described herein and positioned throughout emission capture device 10, modulating the valves to direct the flow of exhaust, controlling the expansion and contraction of legs 60, and communicating with a user interface within the treatment station 22.

Control unit 118 may be any type of control unit known in the art, such as an electronic control unit (ECU) or the like. Control unit 118 preferably includes a microcontroller and a memory system such as ROM, RAM, or the like. The microcontroller may be a standard microcontroller known in the art and may include a central processing unit (CPU) configured to read inputs, perform calculations based on the inputs, and determine outputs. Control unit 118 is configured to communicate with various sensors and valves throughout emission capture device 10 via wired connection 138. Wired connection 138 may be a communication link, such as a bus transceiver or the like. Wired connection 138 may further link a battery (not shown) to control unit 118 to provide power thereto.

Control unit 118 may further be configured to receive embedded software therein. An operator may input software programs directly to control unit 118 via a computer system 140 located within treatment station system 22. These software programs may, for example, correspond to different size ships, ships operating with different fuel types, or different exhaust capture methods. For example, one software program may be configured to operate emission capture device 10 in conjunction with a mainstream cruise ship, and another software program may be configured to operate emission capture device 10 in conjunction with an ultra-large container ship. Alternatively, one software program may allow an operator to select the type of vessel that emission capture device 10 is attaching to so that multiple software programs are not required. Regardless of the software program utilized, computer system 140 may communicate with control unit 118 via a hard-wired communication link such as a bus transceiver.

Figure 10:
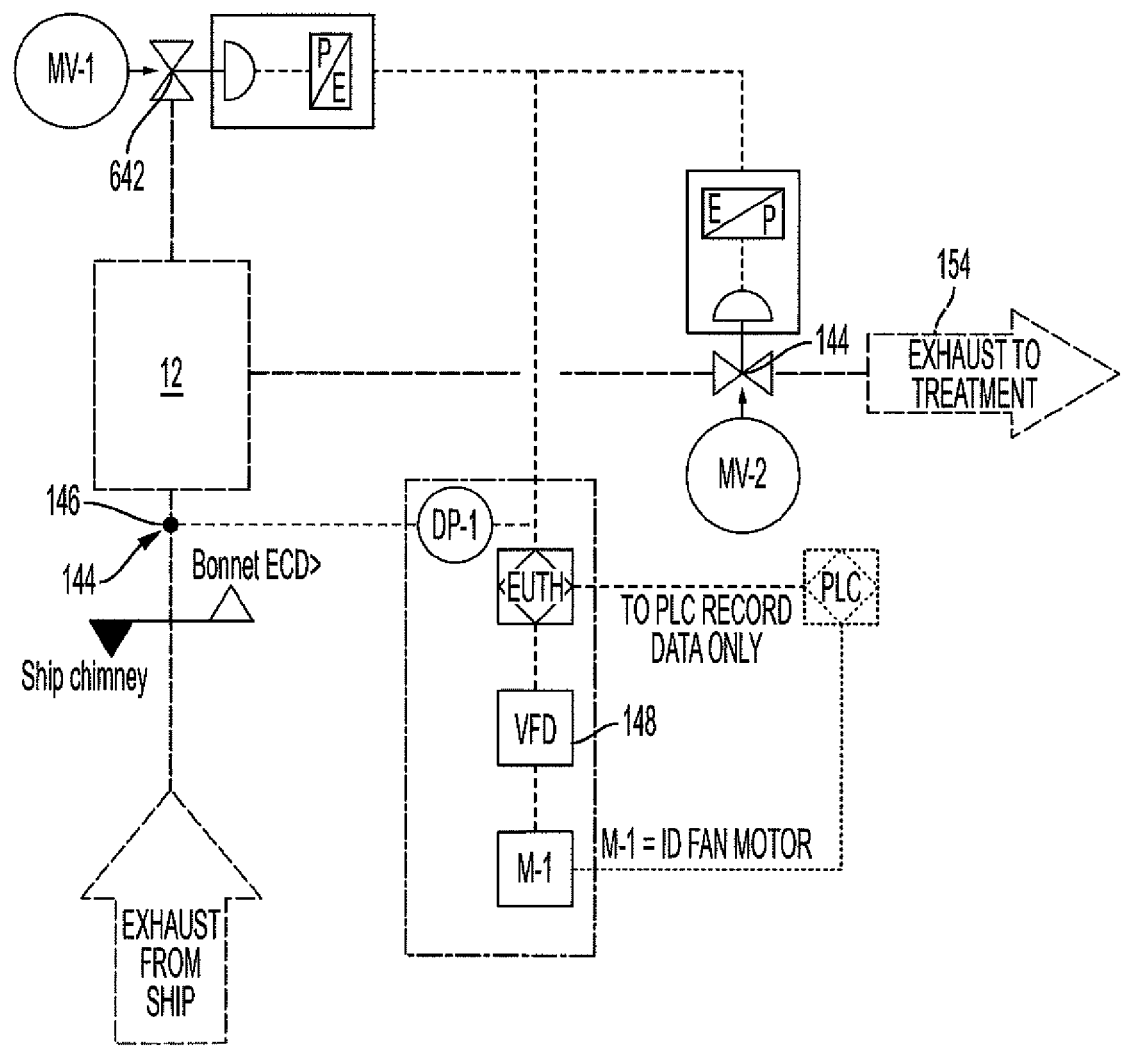
FIG. 10 is a control schematic of the control unit of the emission capture device of FIG. 1.

One of the primary purposes of emission capture device 10 is to create a hermetic seal around a funnel of a vessel and divert the exhaust flow through a series of valves so that it flows to a treatment station where it is converted into a powder rather than escaping to the atmosphere. A schematic reference for this method is illustrated in FIG. 10. Notably, FIG. 10 depicts a schematic in which emission capture device 10 is already attached to funnel 14. In an initial step, exhaust flows out of a stack or funnel 14 toward inlet 16. From the housing 12, the exhaust can flow in one of two directions. First, the exhaust can flow toward valve top 112 which opens directly to the atmosphere. Alternatively, the exhaust can flow toward second valve 142 which diverts the exhaust toward treatment station 22.

To determine whether valve top 112 and/or second valve 142 should be opened or closed, a sensor system 144 is implemented in emission capture device 10. Sensor system 144 includes a first sensor 144 located at inlet 16 of housing 12. First sensor 144 is preferably a differential pressure sensor configured to monitor the pressure change between funnel 14 and housing 12 and communicate that change to control unit 118. First sensor 144 may be internally mounted within housing 12 using fasteners, adhesives, clips, or the like. Preferably, emission capture device 10 maintains the same pressure within housing 12 as the exhaust pressure exiting funnel 14. With a constant pressure, the system will minimize the chance for backflow of exhaust to flow back through funnel 14 and potentially damage the vessel's engines. Furthermore, maintaining a constant pressure in the system allows for an easier conversion of exhaust to powder or another disposable substance within treatment station 22. In addition to a first differential pressure sensor, other sensor types such as temperature, air speed temperature, and the like may be implemented in emission capture device 10. Particularly, temperature sensors may be implemented to ensure gasket 150 is maintaining a constant temperature between funnel 14 and housing 12.

An output signal from first sensor 144 is transmitted to control unit 118. Control unit 118 is configured to receive the output signal and based on a provided software system, send a signal to first and/or second valve 110, 142 to open or close the valve. Examples of these controls are provided below. Control unit 118 includes a memory system, a variable frequency device 148 configured to modulate the frequency and voltage supplied to a motor which in turn opens and closes first and second valves 110, 142.

Various fans may be placed throughout emission capture device 10. The fans (not shown) are configured to push or pull exhaust in a targeted direction within housing 12. For example, a fan located adjacent to valve top 112 may draw exhaust at a greater speed toward valve top 112 in an event where the pressure within housing 12 exceeds the atmospheric pressure and the exhaust needs to rapidly be released to prevent backpressure. Alternatively, the fans may be configured to draw air towards outlet duct 154 if the pressure within the release duct is lower than the pressure within housing 12.

A method of using emission capture device 10 is provided herein. As explained herein, emission capture device 10 may be utilized with exhaust producing devices on land and in the water. The method described herein continues to describe emission capture device 10 in conjunction with a ship having an exhaust-producing funnel. As an initial step, a barge 158 or other vessel holding emission capture device 10 may approach a target vessel having an exhaust-producing funnel 14.

A user may then use a computer system 140 located on barge 158 that is configured to operate emission capture device 10. Computer system 140 is configured to interact with control unit 118 to control the flow of exhaust from funnel 14 to treatment station 22. A user may select a setting that corresponds to the type of ship that emission capture device 10 will attach to. For example, a user may select an ultra-large container ship setting that corresponds to the pressures, temperatures, emission type, and other various settings that an ultra-large container ship produces. The software program may then suggest an adaptor 40 that is configured to attach to a specific funnel of the ultra-large container ship. An operator may then use latch mechanism 46 to secure the required adaptor 40 to housing 12 of emission capture device 10. An O-ring or other sealant may ensure a hermetic seal exists between adaptor 40 and housing 12 such that exhaust cannot escape to the atmosphere.

Figure 13:
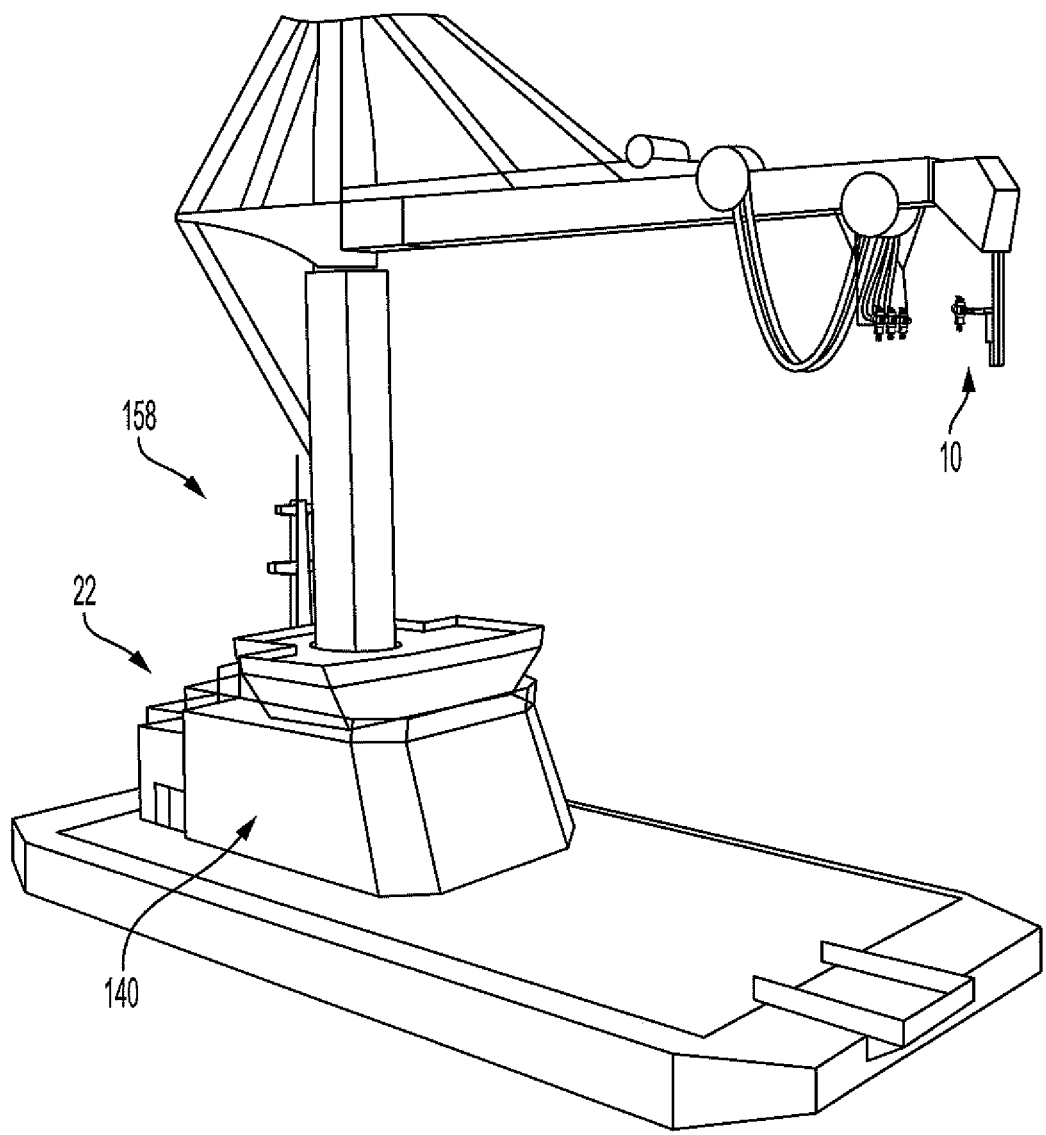
FIG. 13 is a perspective view of a barge housing a treatment system configured to be implemented with the emission capture device of FIG. 1.

As shown in FIG. 13, once the barge 158 is in a sufficient location and the appropriate adaptor 40 has been attached to housing 12, a user can operate a crane in conjunction with a robot to maneuver a robotic arm 28 connected to an interlocking port 26 of an emission capture device 10 toward exhaust funnel 14. Because the robot is preferably a six-axis robot, an operator can maneuver emission capture device in a manner where adaptor 40 is coaxial with and aligned directly above funnel 14. For a ship in which funnel 14 does not extend vertically, the adapter may be positioned coaxial with and direction in front of the opening of funnel 14.

An operator may then guide adaptor 40 over the opening of funnel 14 such that gasket 150 of rim 44 creates a hermetic seal between adaptor 40 and funnel 14. To determine if a hermetic seal has been fully formed between funnel 14 and adaptor 40, emission capture device 10 may be equipped with a series of cameras (not shown) located on housing 12, robotic arm 28, or adaptor 40. The cameras provide live footage to a user interface of computer system 140 so that an operator may see if adaptor 40 has been attached. Further, differential pressure sensor 146 may begin to immediately send a reading to control unit 118 and to computer system 140 to allow a user to see if the pressure within housing 12 has changed, which could signal whether a seal has been created.

Once the hermetic seal has been created, leg control unit 108 may be operated either automatically or based on an input from a user in the computer system 140. This input will direct motor 74 to turn output shaft 62 and gear 68, which in turn causes shaft 62 to translate along its longitudinal axis as the teeth of gear 68 engage with corresponding recesses of toothed portion 104 of shaft 62. As shaft 62 translates down through at least one support 64, shaft limit 66 will contact support 64 which in turn flairs connecting rod 88 outward to push a lower portion of leg 60 away from shaft 62. A spring or other type of biasing element may also be implemented to push leg 60 away from shaft 62 as shaft 62 is lowered. Spring 152 on the end of leg 60 may contact an inner surface of funnel 14 to provide an opposite force that counteracts the force of the leg pushing into the wall. This force equilibrium securely holds emission capture device 10 to funnel 14.

Figure 12:
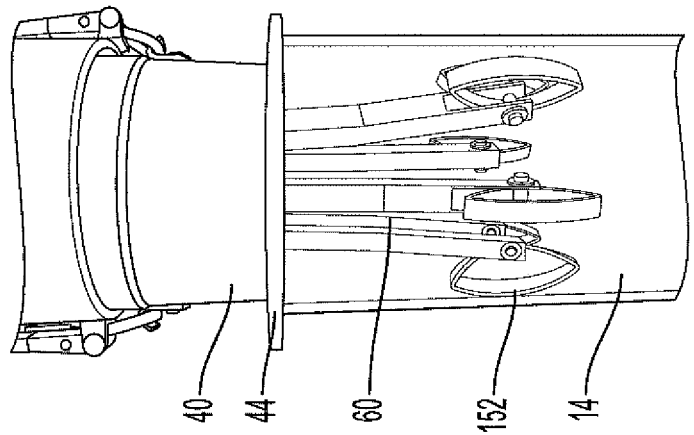
FIG. 12 is a perspective view of emission capture device of FIG. 1 resting over a funnel with the legs expanded.
Figure 11:
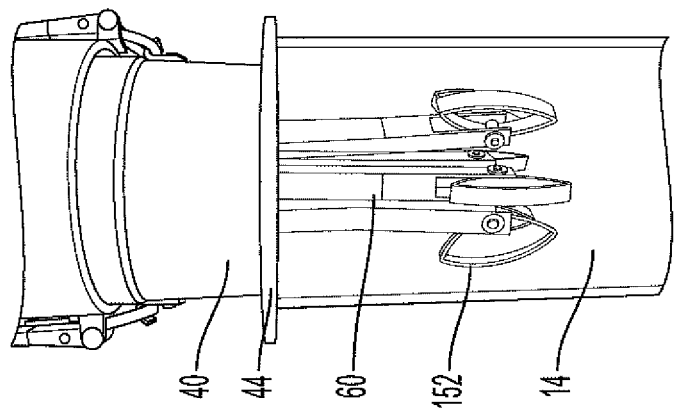
FIG. 11 is a perspective view of emission capture device of FIG. 1 resting over a funnel with the legs contracted.

Once the adapter is sealed and secured to funnel 14, robotic arm 28 may be removed from emission capture device 10 until the emission capture device 10 is ready to be removed from funnel 14. Next, a user may initiate a control of computer system 140 that activates a control system that begins the capture of exhaust. Various sensors throughout the system, such as differential pressure sensor 146, a temperature sensor, and other sensors mentioned herein may begin to record data and transmit that data to both control unit 118 and computer system 140. An operator at computer system 140 may see these readings in real time while simultaneously viewing emission capture device through a variety of cameras or other imaging systems, such as a thermal imaging system, located on emission capture device 10. Control unit 118 is configured to receive sensor data and determine outputs that divert the flow of exhaust to treatment station 22 on barge 158. Notably, control unit 118 is configured to automatically operate emission capture device 10 without the need for user input. However, manual overrides throughout the system allow a user to at least open and close first and second valves 110, 142 to activate motor 74 which causes legs 60 to expand and contract, and to activate and deactivate control unit 118 via computer system 140. The legs 60 can be seen in contracted and expanded views in FIGS. 11 and 12, respectively.

Under ideal operating conditions, the pressure within housing 12 is equal to the atmospheric pressure acting on housing 12. Thus, differential pressure sensor 146 located at first valve 110 ideally will read a value of 0 as there is no change in pressure between funnel 14 and housing 12. However, if differential pressure sensor 146 detects any change in pressure, such as a positive 0.3-inch change or a negative 0.3-inch change on a water gage, or a corresponding minute change in other units such as pounds per square inch (psi) or pascals (Pa), control unit 118 sends a signal to valve top 112 to open using actuator 114 and connecting rod 116. Notably, valve top 112 is not a binary valve with only fully open and fully closed positions. Rather, it has many intermediate positions that allow for minute changes in pressure for differential pressure sensor 146 to detect no change in pressure between inflow pressure and atmospheric pressure.

Control unit 118 can modulate both first valve 110 and second valve 142 simultaneously. For example, if the pressure within housing 12 is greater than the atmospheric pressure and the potential for backpressure to travel down funnel 14 is imminent, control unit 118 could receive a pressure reading from differential pressure sensor 146 that has a positive value and partially close second valve 142 while partially opening first valve 110. Thus, it is possible that neither valve is entirely opened nor entirely closed at any given point in time, and the valves can modulate in harmony to maintain a differential pressure reading of 0 within housing 12.

Emission capture device 10 is configured to operate for a particular funnel the entire duration of a ship's stay in a harbor. Thus, barge 158 can track the movements of a ship to remain adjacent to it until the ship is ready to leave the harbor. Once the ship is ready to leave, an operator can remove emission capture device 10 using a sequence of steps that reverse the set of steps of attaching emission capture device 10. First, valve top 112 may be opened during the entire deactivation procedure to allow the ship's exhaust to be released directly into the atmosphere without the potential for backpressure. Next, robotic arm 28 may reattach to interlocking port 26 of housing 12 if it had been previously detached. Then, a user may operate a control that causes motor 74 to turn output shaft 62 in an opposite direction than what it turned to attach legs 60 to an inner surface of funnel 14. This causes the lower portion 82 of legs 60 to pivot inward toward shaft 62 and away from the inner surface of funnel 14. Finally, a user may operator robotic arm 28 to lift emission capture device 10 off and away from funnel 14. Because emission capture device 10 has only a modular adapter, a user can then quickly swap out adapters to configure to another ship entering the harbor, and the entire process can be repeated.

Although the embodiment described herein relates to a single emission capture device 10 that attaches to a single funnel 14 of a ship, it is envisioned that multiple emission capture devices could be joined in series for a plurality of funnels of ships or of other emission-producing devices on land, such as smokestacks, industrial chimneys, and the like.

Figure 14:
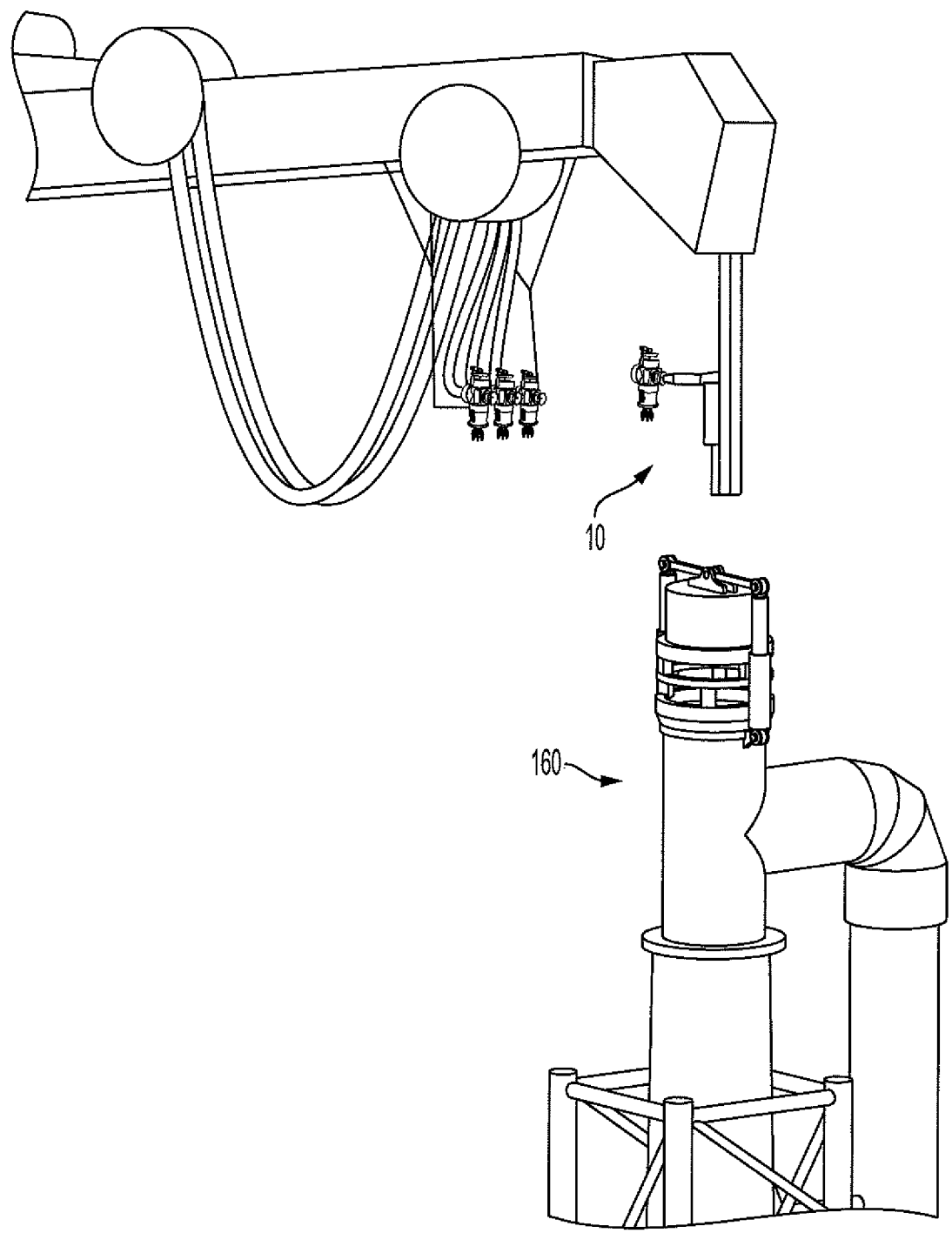
FIG. 14 is a perspective view of the emission capture device of FIG. 1 being implemented with an industrial chimney.

FIG. 14 depicts another embodiment of emission capture device 10 used in conjunction with an industrial chimney 160. In such an embodiment, emission capture device 10 may be attached to an arm, such as robotic arm, a crane, or the like, to be maneuvered over chimney 160. The arm holding emission capture device 10 may also be attached to a vehicle on wheels or treads, such as a truck or an excavator. The industrial chimney 160 may extend from a glass or metallurgical mill furnace, or other industrial furnace types that produce exhaust. The operation of emission capture device 10 is the same regardless of whether emission capture device 10 is implemented with a funnel 14 of a ship or an industrial chimney 160.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

The invention claimed is:

1. A system of controlling the capture of emissions from an exhaust emitter comprising:
   a housing including an inlet, a first outlet, and a second outlet;
   an adapter configured to attach to the exhaust emitter and the inlet of the housing;
   an attachment assembly coupled to the exhaust emitter, the attachment assembly including at least one leg pivotably coupled to the adapter;
   at least one valve coupled to the housing; and
   a control unit capable of communicating with the at least one valve to control the emission of exhaust through the device,
   wherein the at least one valve includes a first valve located between the housing and the first outlet, and a second valve located between the housing and the second outlet.

2. The system according to claim 1, wherein the exhaust emitter is at least one of an exhaust-producing funnel of a ship, a smokestack of a power plant, or a chimney of an industrial system.

3. The system according to claim 1, wherein the at least one leg includes six legs positioned radially around a shaft.

4. The system according to claim 3, wherein the attachment assembly further comprises a motor and a gear assembly, the gear assembly operably coupling the shaft to the motor.

5. The system according to claim 1, wherein the shaft includes teeth configured to mate with a gear of the gear assembly.

6. A system for capturing exhaust from a stack, the system comprising:
   a housing including at least one inlet and at least one outlet;
   an actuator operably coupled to a gear assembly;
   a shaft within the housing operably coupled to the gear assembly, the shaft attached to at least one leg configured to engage the stack;
   at least one valve attached to the housing at the least one outlet; and
   at least one sensor in communication with a control unit, the control unit configured to adjust the at least one valve based on a reading from the at least one sensor.

7. The system according to claim 6, further comprising an adaptor configured to couple with and create a hermetic seal with the housing and with the stack.

8. The system according to claim 7, wherein the adaptor is selectable according to the stack.

9. The system according to claim 6, wherein the actuator is a at least one of a motor or a hydraulic piston.

10. The system according to claim 6, wherein the shaft includes teeth corresponding to teeth gear assembly such that rotation of the gear assembly causes the shaft to translate relative to the gear assembly.

11. The system according to claim 6, wherein the at least one valve includes a first valve attached to the housing and exposed to the atmosphere and a second valve attached to the housing and exposed to an exhaust outlet.

12. The system according to claim 11, wherein the control unit is configured to modulate the first valve and the second valve to maintain an atmospheric pressure within the housing.

13. The system according to claim 6, wherein the at least one leg has three outer walls defining a cavity therebetween.

14. A method of capturing emissions from an exhaust emitter comprising:
   activating an actuator to translate a shaft relative to an adaptor;
   pivoting at least one leg operably coupled to the shaft to engage the exhaust emitter;
   sealing an emission capture device to the exhaust emitter by attaching a gasket of the adaptor to the exhaust emitter;
   sensing emission data from an inlet of a housing; and
   modulating a first valve operably coupled to a first outlet of the housing and a second valve operably coupled to a second outlet of the housing based on the emission data.

15. The method of claim 14, wherein the step of sensing emission data includes sensing the emission data from a differential pressure sensor located in the housing.

16. The method of claim 15, wherein the step of modulating the first valve and second valve includes opening the first valve when the differential pressure sensor detects a non-zero value between an exhaust pressure and an atmospheric pressure.

17. The method of claim 15, wherein the step of modulating the first valve and second valve includes opening the second valve and closing the first valve when the differential pressure sensor detects a zero valve between an exhaust pressure and an atmospheric pressure.

18. The method of claim 14, further comprising positioning the emission capture device over the funnel with a robotic arm.

19. The method of claim 14, wherein the step of modulating the first valve and second valve includes maintaining a constant temperature within the housing.

* * * * *